Jan. 18, 1966
A. A. MATTHIES
3,230,332
THERMAL TIMER HAVING CAM ACTUATED CONTROL MEANS
Filed Sept. 30, 1963
2 Sheets-Sheet 1
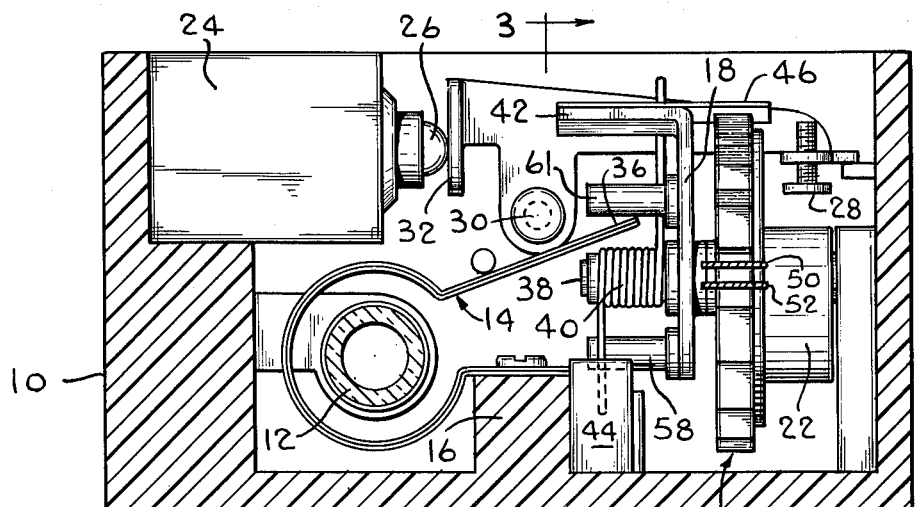
FIG. 1
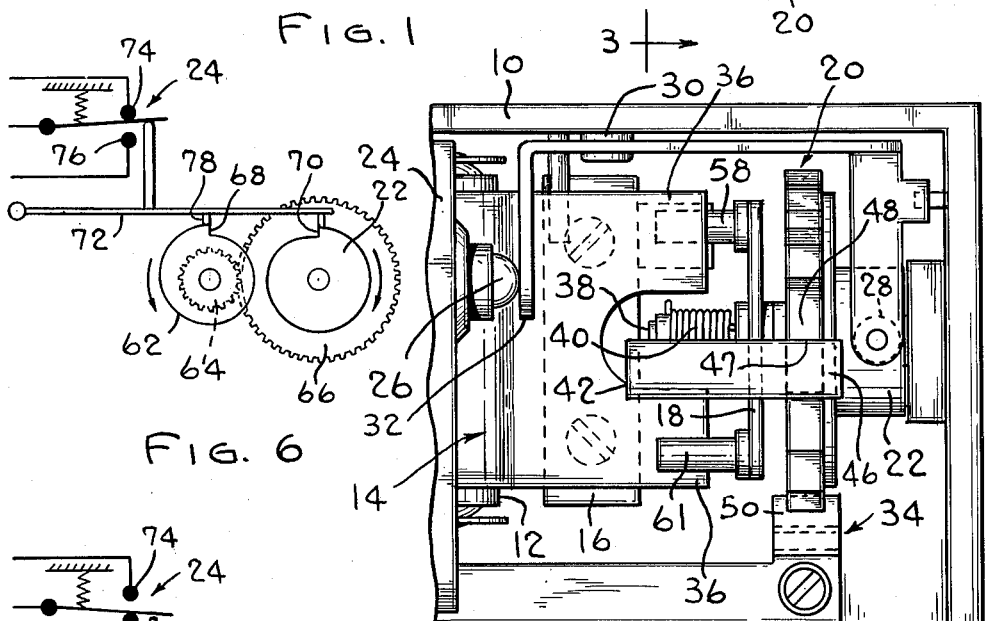
FIG. 2
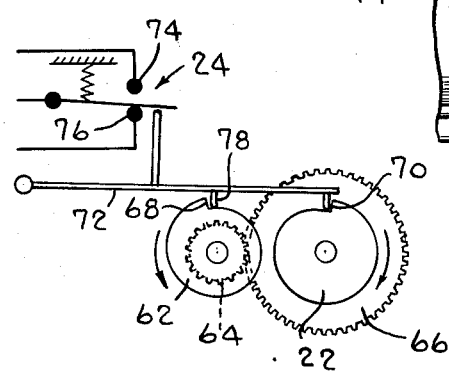
FIG. 6
FIG. 7
INVENTOR.
ALAN A. MATTHIES
BY *Bayard H. Michael*
ATTORNEY Jan. 18, 1966  A. A. MATTHIES  3,230,332
THERMAL TIMER HAVING CAM ACTUATED CONTROL MEANS
Filed Sept. 30, 1963  2 Sheets-Sheet 2
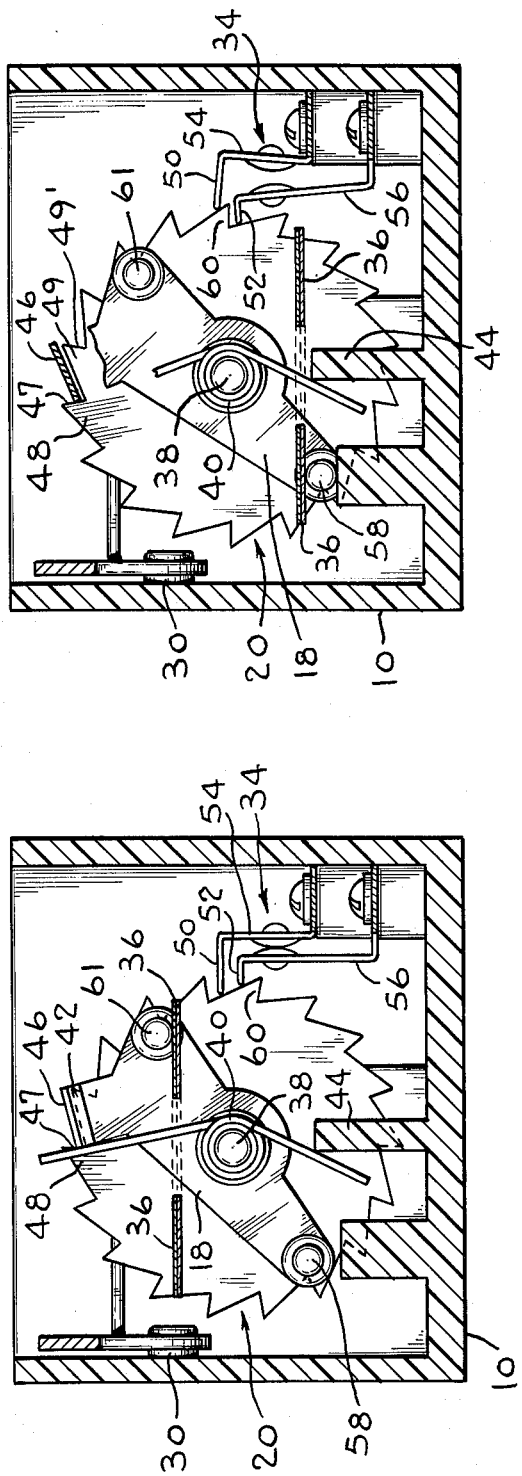
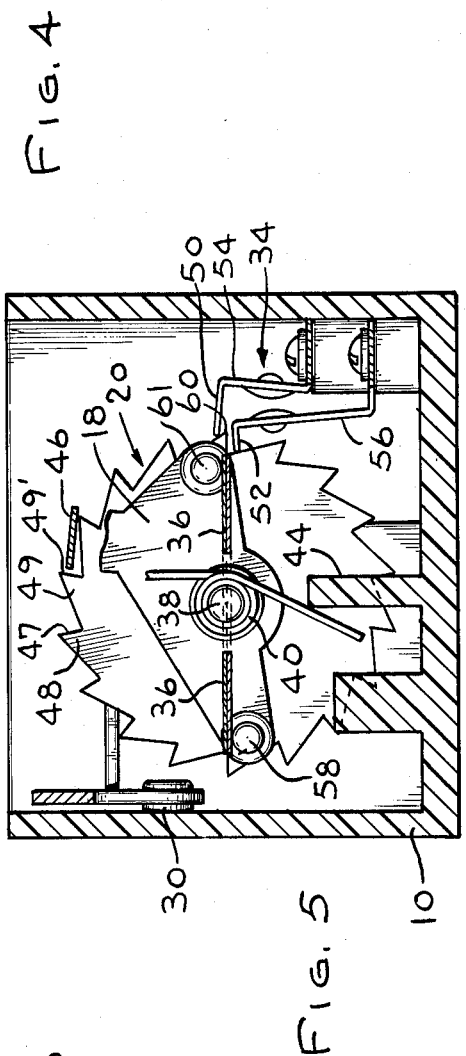
INVENTOR.
ALAN A. MATTHIES
BY
ATTORNEY Patented Jan. 18, 1966

3,230,332
THERMAL TIMER HAVING CAM ACTUATED CONTROL MEANS
Alan A. Matthies, Milwaukee, Wis., assignor to Controls Company of America, Melrose Park, Ill., a corporation of Delaware
Filed Sept. 30, 1963, Ser. No. 312,688
4 Claims. (Cl. 200—122)

This invention pertains to electric timers, and, in particular, to a timer which employs a heat motor driven cam which actuates a control switch in a predetermined sequence. The heat motor is self-cycling and consists of an electric heater and a reciprocating bimetal which periodically energizes and de-energizes the heater and also advances the cam.

A timer of this type has numerous advantages over the electric motor driven timers known today.

One of the principal advantages of the timer embodying the present invention is that it is particularly adapted for applications where the control switch has to be actuated between relatively long time intervals (as once per hour or per a longer time period). When employing electric motor driven timers for such applications, the speed of the motor shaft has to be stepped down by means of reduction gearing in order to provide the required slow rotation of the timer's cam. In the present timer, the required slow rotation of the cam presents no problem, since the heat motor and its related parts are capable of producing accurate motion at any desirable speed. This feature, of course, eliminates the reduction gearing. For this reason also, the noises common in today's electric motor timers are eliminated.

Another highly desirable feature is that the heat motor driven timer requires no lubrication and, therefore, will maintain its accuracy over a wide ambient temperature range. In timers requiring lubrication, the lubricating oil stiffens at low temperatures and produces a drag which impairs the timer's accuracy.

A further advantage of the timer embodying the present invention is that the speed of the cam and thus the duration of the timer's cycle (one full revolution of the cam) is dependent upon the voltage input of the heat motor. Of course, a constant voltage input can be provided to achieve a uniform cam rotation and cycle time. However, in numerous applications it is desirable to vary the length of the control cycle in accordance with the voltage input of a particular circuit. In such a case the heater element is connected in such circuit. A particular application where the voltage compensation feature of the present timer is of a great advantage is the defrost timer of a refrigeration system. In such systems the input voltage variations affect the heat output of the refrigerator defrost heaters, thus requiring a longer than normal defrost period at low voltage and a shorter defrost period at high voltage. This voltage variation will be correspondingly reflected in a decreased or increased heat output of the timer's heater, thereby causing a corresponding speed variation of the cam rotation, and thus providing a longer defrost time to compensate for the decreased heat output of the refrigerator's defrost heaters at low voltage and a shorter defrost time at high voltage.

Therefore, an object of this invention is to provide a timer having the above described advantages.

A further object of this invention is to provide a defrost control timer for refrigerators which will be responsive to the input voltage variations of the refrigeration circuit and thereby produce corresponding variations in the defrost time.

Other objects and advantages will be pointed out in, or be apparent from, the specification and claims, as will obvious modifications of the two embodiments shown in the drawings, in which:

FIG. 1 is a cross sectional view of the timer embodying the present invention;

FIG. 2 is a fragmentary top view of the timer shown in FIG. 1;

FIGS. 3–5 are sectional views taken on line 3—3 of FIG. 1 and illustrate the advancement of the ratchet wheel and the corresponding actuation of the heater switch during one cycle of the bimetal; and FIGS. 6 and 7 are schematic views of a second embodiment of this invention, showing in particular a slow moving trip initiation cam and a fast moving trip termination cam.

Referring to the drawings, the timer embodying the present invention is comprised of a housing 10 containing a heater 12 and a bimetal 14 mounted on support 16 and being bent to encircle the heater. The bimetal is adapted to reciprocate by warping toward and away from the heater and to thereby engage rocker lever 18 and produce a step-by-step rotation of ratchet wheel 20 and cam 22. A control switch 24 having an outwardly biased plunger 26 is mounted in the housing and is adapted to be actuated upon follower 28 engaging the cam 22 and being pivoted around pin 30 to cause tab 32 to depress plunger 26. The energization and de-energization of the heater 12 is attained by heater switch 34 which is connected in series with the heater and is actuated in response to the advancement of the ratchet wheel.

With the parts as shown in FIG. 1 and FIG. 3, the bimetal 14 is at its uppermost position and the heater switch 34 has just closed thereby energizing heater 12. In response to the heat produced by the heater, bimetal 14 warps toward the heater thereby causing a corresponding downward motion of end 36 of the bimetal. This downward movement will cause the rocker lever 18 to pivot in a clockwise direction (when viewed in FIG. 3) around pin 38 in response to the bias of hairspring 40 which engages tab 42 of the rocker lever and stop 44 of the housing. This pivotal motion will cause drive arm 46, which is secured to tab 42, to move away from radial face 47 of ratchet tooth 48 yet not to override the next successive tooth 49. In effect, the drive arm 46 goes through a lost motion during the initial downward movement of bimetal end 36. At this point it is important to note that the inwardly bent ends 50 and 52 of the switch blades 54 and 56 respectively are in engagement with another ratchet tooth and thus prevent any clockwise movement of the ratchet wheel during the above described motion of the drive arm.

After the initial downward movement of bimetal end 36, the bimetal end engages pin 58 and upon further downward movement (to the position as shown in FIG. 4) causes the rocker lever 18 to pivot in a counterclockwise direction and in opposition to the bias of spring 40 thereby engaging drive arm 46 with the face 47 of ratchet tooth 48 and advancing the ratchet wheel 20 in a counterclockwise direction. This advancement of the ratchet wheel causes the tip 52 of switch blade 56 to ride over tooth 60 of the ratchet wheel yet maintain the end 50 of the other switch blade in engagement with the top surface of tooth 60 to thereby open the heater switch 34.

At this point the heater 12 will be de-energized and the ambient within the housing will begin to drop. In response to this drop the bimetal 14 will warp away from the heater 12, thereby permitting spring 40 to pivot rocker lever 18 in a clockwise direction. As the bimetal travels upwardly to the position shown in FIG. 5, the drive arm 46 rides over tooth 49 and engages its radial face 49[1]. Upon further upward movement, bimetal end 36 will engage pin 61 and again pivot the rocker link in a counterclockwise direction. This pivotal motion will advance the ratchet wheel, thereby causing blade end 50 to ride over tooth 60 to thereby again close heater switch 34 to energize heater 12. In regard to the above, it is important to note that again during the clockwise movement of the drive arm the bent end 52 prevents a clockwise movement of the ratchet wheel 20. After the heater has been energized as above, the ambient in the housing will again increase and thereby cause the bimetal 14 to cycle through the steps described above.

One interesting feature of the above described stepping action is that the ratchet wheel is only partially advanced during the downward motion of the bimetal and is further partially advanced during the upward motion of the bimetal to complete its advancement by one tooth. Also, bimetal switch 34 is both opened and again closed during the advancement of one tooth of the ratchet wheel. These features permit the use of a very simple and inexpensive switch, and also permit the utilization of the switch as a stop member for the ratchet to thereby eliminate one "extra" element usually required in ratchet mechanisms.

In response to the cycling movement of the bimetal as described above the rise of the cam 22 will be brought underneath follower 28, thereby actuating switch 24 as described heretofore.

It should be appreciated that in the described mechanism the hairspring 40 causes two clockwise rotations of the rocker lever 18, i.e., during the downward movement of end 36 of the bimetal from the position shown in FIG. 3 to the instant when the end 36 engages pin 58, and during the upward movement of end 36 between the positions shown in FIGS. 4 and 5. It is important to note however that the first clockwise movement is of a smaller angular distance than the second, since the first movement is not sufficiently large to cause the drive arm 46 to ride over the ratchet tooth; whereas the second movement causes the drive arm to ride over a tooth. Such operation is attained by providing a greater downward travel of the bimetal end 36 while it is in contact with pin 58 than the travel while the end is in contact with pin 61. Thus, during the initial downward motion of end 36, the drive arm 46 goes through a small lost motion step, and thereafter goes through a greater stepping movement during which it advances the ratchet wheel; whereas during the upward movement, the hairspring moves the drive arm in respect to the ratchet wheel a distance equal to the stepping movement, whereafter end 36 (and pin 61) causes a second stepping movement and advancement of the wheel which is equal in degrees to the initial lost motion. The first and second stepping movements cause the ratchet wheel to advance the distance of one tooth.

A modification of the above described timer is schematically illustrated in FIGS. 6 and 7, wherein the timer has been modified to obtain the closing of the control switch 24 in response to the movement of the bimetal driven cam 22 and to obtain an opening of the control switch in response to a fast moving cam 62, thereby permitting accurate timing of the length of the switch trip period. To attain this purpose, the fast moving cam 62 is connected for rotation with cam 22 by means of gears 64 and 66. Further, both cams are provided with sharp drop surfaces 68 and 70 respectively. This type of connection will cause the cams to rotate in opposite directions, as illustrated, cam 22 rotating clockwise and cam 62 counterclockwise (when viewed in FIGS. 6 and 7). Thus upon clockwise rotation of cam 22 from the position shown in FIG. 6, the follower arm 72 will drop on surface 70, thereby causing switch 24 to open normally closed contact 74 and move to contact 76. Further rotation of both cams will cause rise of cam 62 to come under tab 78 of follower arm 72 and move the switch 24 away from contact 76 and close normally closed contact 74. Upon further rotation of both cams, the switch will not be affected by the cam 62 and will only again snap to the position shown in FIG. 7 when the lever arm 72 rides over drop 70 of cam 22.

Although but two embodiments of the present invention have been illustrated and described, it will be apparent to those skilled in the art that various changes and modifications may be made therein without departing from the spirit of the invention or from the scope of the appended claims.

I claim:

1. A timer comprising, control means, a self-cycling heat motor, a cam means driven by said self-cycling heat motor and operable to actuate said control means, said cam means comprising a first cam operable to actuate said control means by moving them from a first to a second position and a second cam operable to move at a different speed than said first cam and operable to move said control means from said second to said first position.

2. A switching mechanism comprising, a ratchet wheel having a predetermined number of teeth, a first and second switch blade biased against one tooth of the ratchet wheel and being in a make-circuit position in respect to each other when in this position, and motor means operable to rotate said ratchet wheel in two separate step motions through an angular distance of one ratchet tooth, said first step motion causing the first of said switch blades to ride over said tooth and to contact the next successive tooth, thereby causing said blades to assume a break-circuit position, the second of said step motions causing the second of said blades to ride over said tooth and to contact said next successive tooth and thereby causing said blades to assume a make-circuit position, said motor means comprising a drive arm engaging a tooth of said ratchet wheel, first driving means operably engaging said drive arm and moving said arm and ratchet wheel in the direction of intended ratchet wheel rotation through the first step, second driving means operably engaging said drive arm and moving said arm in a direction opposite of the intended ratchet wheel rotation and causing said drive arm to ride over said engaged tooth and to engage a next successive tooth, thereafter said first driving means operably engaging said drive arm and moving said arm and ratchet wheel in a direction of intended ratchet wheel rotation through the second step.

3. A mechanism according to claim 2 wherein said first driving means comprises bimetal means operable to move said drive arm in the direction of intended ratchet wheel rotation, and said second driving means comprises a spring biasing said drive arm in a direction opposite the intended ratchet wheel rotation.

4. A mechanism according to claim 3 wherein said bimetal means includes a heater and said switch blades make and break a circuit to energize and de-energize said heater.

References Cited by the Examiner

UNITED STATES PATENTS

| 2,114,512 | 4/1938 | Weschcke | 200—122 X |
| 2,487,154 | 11/1949 | Lloyd | 310—4 |
| 2,572,162 | 10/1951 | Koonz | 310—4 X |
| 2,622,677 | 12/1952 | Caffier et al. | 200—136.3 |
| 2,970,454 | 2/1961 | Everard et al. | 200—138 X |

BERNARD A. GILHEANY, *Primary Examiner.*

ROBERT K. SCHAEFER, *Examiner.*